United States Patent
Buscemi et al.

(10) Patent No.: US 8,576,053 B2
(45) Date of Patent: Nov. 5, 2013

(54) NEAR FIELD COMMUNICATION DEVICE AND METHOD FOR NEAR FIELD COMMUNICATION

(75) Inventors: Meik Buscemi, Stuttgart (DE); Stephen Tiedemann, Stuttgart (DE); Frank Dawidowsky, Stuttgart (DE); Klaus Röhrle, Ostfildern (DE); Dietmar Schill, Winnenden (DE)

(73) Assignee: Sony Corporation, Tokyo (JP)

( * ) Notice: Subject to any disclaimer, the term of this patent is extended or adjusted under 35 U.S.C. 154(b) by 250 days.

(21) Appl. No.: 13/240,309

(22) Filed: Sep. 22, 2011

(65) Prior Publication Data

US 2012/0092137 A1 Apr. 19, 2012

(30) Foreign Application Priority Data

Oct. 14, 2010 (EP) .................................... 10013644

(51) Int. Cl.
*H04Q 5/22* (2006.01)

(52) U.S. Cl.
USPC ......... 340/10.51; 340/5.2; 340/5.8; 340/10.1; 340/10.3; 340/10.42; 726/21; 726/29

(58) Field of Classification Search
USPC ........... 340/5.2, 5.8, 10.1, 10.3, 10.42, 10.52; 726/21, 29
See application file for complete search history.

(56) References Cited

U.S. PATENT DOCUMENTS

| | | | |
|---|---|---|---|
| 6,415,978 B1 | 7/2002 | McAllister | |
| 7,646,300 B2* | 1/2010 | Stewart et al. | 340/572.1 |
| 2006/0170565 A1* | 8/2006 | Husak et al. | 340/825.49 |
| 2007/0126556 A1 | 6/2007 | Subramanian et al. | |
| 2008/0011833 A1 | 1/2008 | Saarisalo | |
| 2009/0265544 A1 | 10/2009 | Moona et al. | |
| 2010/0081385 A1 | 4/2010 | Lin et al. | |

FOREIGN PATENT DOCUMENTS

| | | |
|---|---|---|
| EP | 2 075 921 A2 | 7/2009 |
| EP | 2 106 107 A1 | 9/2009 |
| WO | WO 2009/039535 A2 | 3/2009 |

* cited by examiner

*Primary Examiner* — Daniel Wu
*Assistant Examiner* — Benyam Haile
(74) *Attorney, Agent, or Firm* — Oblon, Spivak, McClelland, Maier & Neustadt, L.L.P.

(57) ABSTRACT

Near field communication (NFC) device including a processor and a front end unit (FEU) to communicate with an external reader/writer device. The FEU stores, by first memory, a first number of sets of application parameters, each set including first and second identifiers. The processor stores, by second memory, the application and a second number of the sets. The FEU receives a communication request from the external device, including a certain first identifier. The FEU checks, when the request is received, whether the certain first identifier is stored in the first memory. If yes, a response is sent to the external device, including a respective second identifier, which is in the same set of parameters as the certain first identifier. The FEU sends, each time a request is received, a response to the processor. The processor controls which sets of parameters are stored in the first memory based on the response.

17 Claims, 7 Drawing Sheets

NEAR FIELD COMMUNICATION DEVICE AND METHOD FOR NEAR FIELD COMMUNICATION

An embodiment of the invention relates to a near field communication device. A further embodiment relates to a method for near field communication. A still further embodiment of the invention relates to a near field communication system.

BACKGROUND

In the near future it is expected that near field communication devices will be widely employed as mass consumer products. Therefore, it is desirable that such devices have low manufacturing costs. Further, it is desirable that near field communication devices are capable of quickly establishing a connection with a reader/writer device. For example, when near field communication devices are used for payment when entering a sub way entrance, many people want to pass in as little time as possible. The connection establishment between the reader/writer and the near field communication device must therefore be fast.

BRIEF SUMMARY

It is an object of embodiments of the invention to provide a near field communication device having low manufacturing costs and allowing a fast establishment of a connection with a reader/writer device. It is a further objective to provide a respective method, computer readable storage medium and system.

These objectives are solved by the near field communication device, near field communication and near field communication system according to claims 1, 11, 16 and 17, respectively.

Further details of embodiments of the invention will become apparent from a consideration of the drawings and ensuing the description.

BRIEF DESCRIPTION OF THE SEVERAL VIEWS OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following, embodiments of the invention are described. It is important to note, that all described embodiments in the following may be combined in any way, i.e. there is no limitation that certain described embodiments may not be combined with others. Further, it should be noted that same reference signs throughout the figures denote same or similar elements.

It is to be understood that other embodiments may be utilized and structural or logical changes may be made without departing from the scope of the invention. The following detailed description, therefore, is not to be taken in a limiting sense, and the scope of the present invention is defined by the appended claims.

It is to be understood that the features of the various embodiments described herein may be combined with each other, unless specifically noted otherwise.

Figure 1:
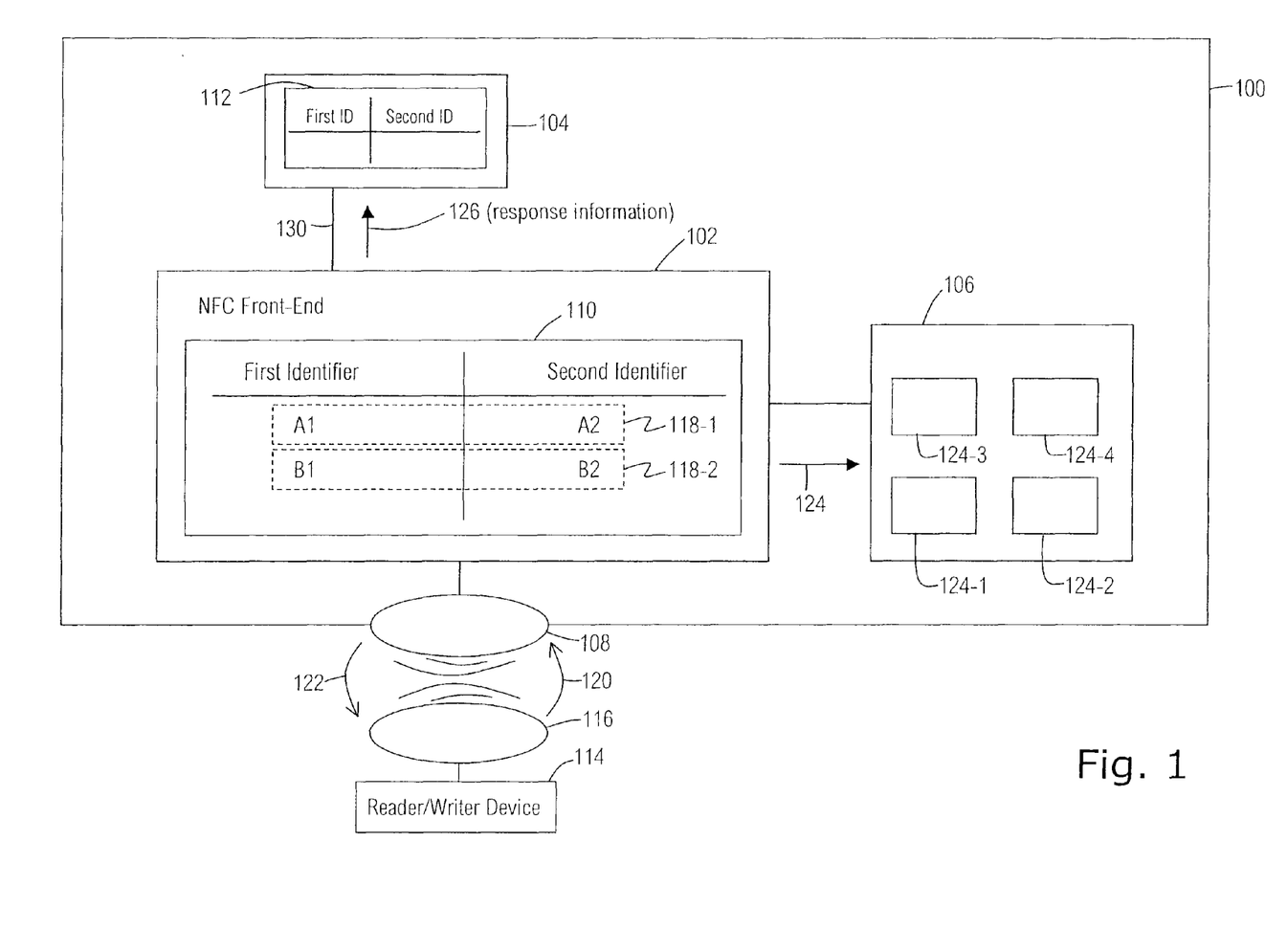
FIG. 1 shows an embodiment of a near field communication device.

FIG. 1 shows a near field communication device 100. Near field communication device 100 includes a front end unit 102 and a processing unit 104. The processing unit 104 may e.g. be a central processing unit. The processing unit 104 may also be referred to as "host". Optionally the processing unit 104 may include one or more application specific data structures storing e.g. data related to a payment service such as e.g. a credit card number or the like. It is also possible, that the processing unit 104 is connected to one or more secure elements included in other storages (not shown), e.g. a Subscriber Identity Module (SIM) card. The term "processing unit" should not be understood in a limiting sense to necessarily have high processing capabilities. Depending on the design of near field communication device 100, the processing unit 104 may simply be a memory with little processing capabilities.

Optionally, the near field communication device 100 may include a further processing unit 106. The further processing unit 106 may be an independent hardware processing unit. The further processing unit 106 may also be a secure element storing data of multiple applications. In the example of FIG. 1, further processing unit 106 includes data structures 124-1, 124-2, 124-3 and 124-4 used for corresponding applications such as e.g. a payment service. In the case of a payment service it may be advantageous that the further processing unit is a secure element such that data related to the payment service such as e.g. a credit card number or the like can be stored in a secure manner. An example for a secure element is a Subscriber Identity Module (SIM) card.

Near field communication device 100 further comprises a near field communication interface 108 connected to the front end unit 102. Near field communication interface 108 includes e.g. an antenna for transmitting and receiving signals to/from a reader/writer device 114 which likewise includes a further near field communication interface 116.

The front end unit 102 includes a first memory 110 having a first size and processing unit 104 includes a second memory 112 having a second size. The first memory 110 is smaller than the second memory 112, i.e. the first size is smaller than the second size.

Generally, in the front end unit 102 only little memory is available. Moreover, increasing the size of the memory in the front end unit is very expensive. Therefore, it is desirable to keep the memory size of the first memory 110 to a minimum required amount. In some embodiments the first memory 110 may have size of only 1 kilobyte. It is also possible that the size is in a range of 1-4 kilobytes, 4-8 kilobytes or 8-16 kilobytes, 16-32 kilobytes, and/or 32-50 kilobytes. The first memory may also include a RAM part and a flash memory part. In this case, the RAM may have a size of 5 kilobytes and the flash memory of 52 kilobytes. Further, the second memory could have a size of a megabyte or at least 32 Kb. The second memory could further be a high-capacity SIM having 50 kilobytes RAM and 16 megabytes flash memory. Other host platforms could have even more (few hundred megabytes RAM).

It will be explained further below how it is achieved that the first memory 110 can be small in comparison to the second memory 112 while still allowing a fast establishment of a connection between the near field communication 100 and the reader/writer device 114.

The first memory 110 is adapted to store a first number of sets of parameters of an application. In the example of FIG. 1, first memory 110 has a size so as to store a first set of parameters 118-1 and a second set of parameters 118-2. Thus, in the example of FIG. 1 the first number is 2. This assumption is for a better understanding of the embodiment only and should not be seen as limiting in any way. In other embodiments the first number may be 3-5, 4-6, 5-7 or more.

Each set of parameters includes a first identifier and a second identifier. The first set of parameters 118-1 includes a first identifier A1 and a second identifier A2. Further, the second set of parameters 118-2 includes a first identifier B1 and a second identifier B2.

Further, the second memory 112 is also adapted to store sets of parameters. The sets of parameters stored in the second memory 112 essentially have the same format as the sets of parameters stored in the first memory 110. The sets of parameters stored in the second memory 112 also comprise respective first and second identifiers.

Figure 2:
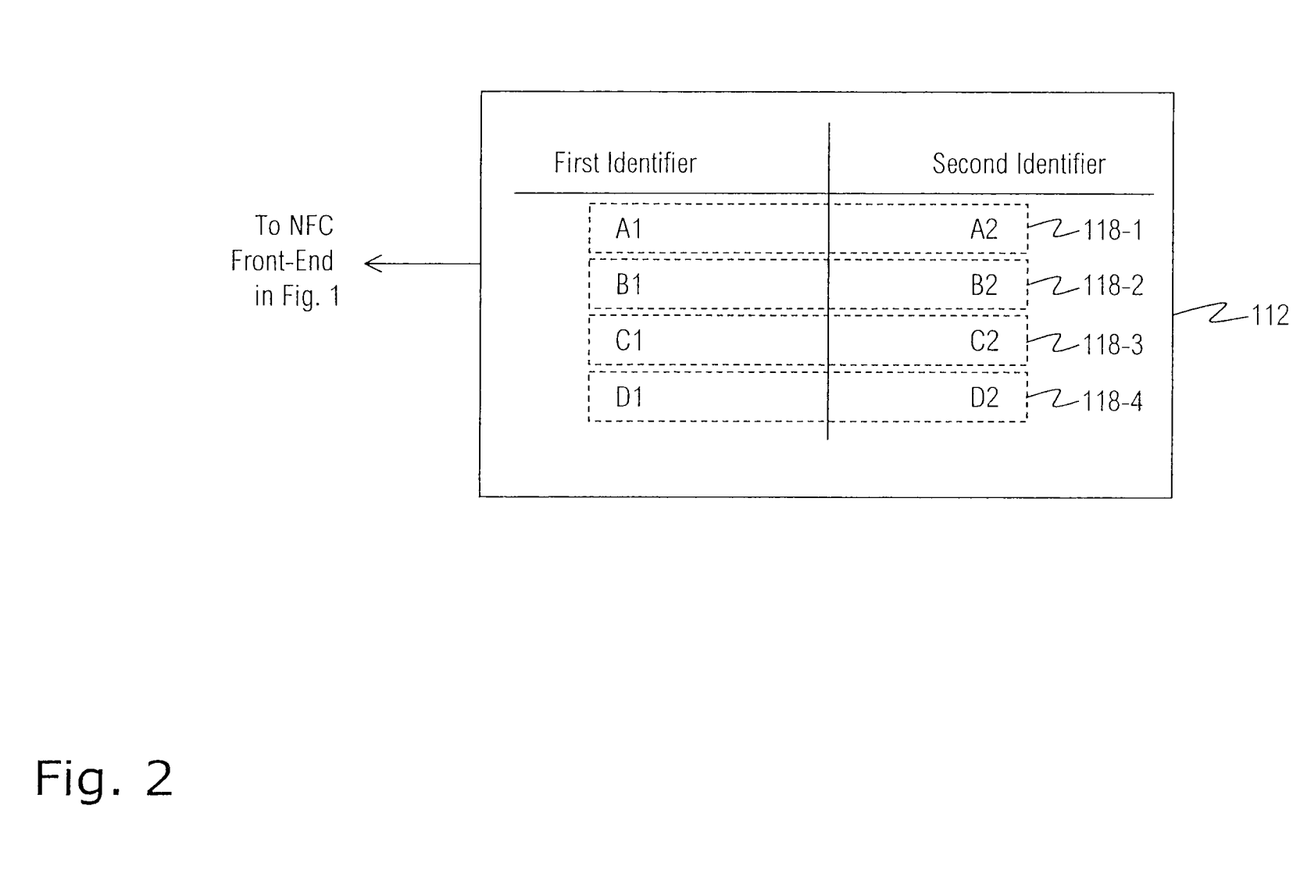
FIG. 2 shows an example of data stored in a processing unit included in the near field communication device.

FIG. 2 shows an example of a content of the second memory 112 of FIG. 1. As mentioned, the second memory 112 is larger than the first memory 110 and has a size so as to store a second number of sets of parameters, the second number being larger than the first number. Hence, a larger number of sets of parameters may be stored. In the example of FIGS. 1 and 2, it is assumed that the second memory has a size so as to store four set of parameters 118-1, 118-2, 118-3 and 118-4. Hence, the second number is four. Again, this assumption is for a better understanding only and should not be seen as limiting in any way. In other embodiments the second number may be 4-6, 5-7, 10-15, 15-20, 20-30 or more. As mentioned, though, in general the second memory 112 is larger that the first memory 110 so that the second number is generally higher than the first number.

As seen, the processing unit 104 is connected with the front end unit 102 via a connection 130. Via the connection 130 the processing unit 104 may transfer sets of parameters to the front end unit 102 which may then be stored in the first memory 110. For transferring the sets of parameters a predefined communication protocol is used. This protocol allows the processing unit 104 to upload sets of parameters to the front end unit 102. Moreover, based on the communication protocol, the processing unit 104 may control which sets of parameters are transferred and to be stored in the first memory 110 of the front end unit 102. Based on the communication protocol, the processing unit 104 may also delete and/or overwrite sets of parameters stored in the first memory 110.

When the front end unit 102 receives a communication establishment request 120 including a certain first identifier which is stored in the first memory 110, the front end unit 102 can immediately respond to the communication establishment request 120 with a response 122 including the respective second identifier. For example, assuming that a communication establishment request 120 is received including a first identifier A1, in the example shown in FIG. 1, since the set of parameters 118-1 including the first identifier A1 is stored in the first memory 110, the front end unit 102 can immediately send a response 122 including the second identifier A2. "Immediately" may mean "as soon as possible". In some embodiments, "immediately" may also mean "within the next time slot". Note that, in some embodiments, the communication protocol between the reader/writer device 114 and the front end unit 102 may at least partly time based (time division multiplexed).

It should be noted that some applications require an extremely quick connection establishment. In fact, some applications can only be run in case the respective first identifier is stored in the first memory 110. Therefore, the embodiment of FIG. 1 makes it possible that such applications can be run on the near field communication device 100 at all.

In other words, the front end unit 102 is adapted to check, when a communication establishment request 120 is received whether the certain first identifier (which was included in the communication establishment request 120) is stored in the first memory 110. If this is the case, a response 122 is sent to the reader/writer device "immediately", the response including a respective second identifier (see above). In the following this case may also be described by "the communication establishment request could be handled immediately".

Each time when (i.e. whenever) the front end unit 102 receives a communication establishment request 120, the front end unit 102 generates response information 126. The response information 126 indicates whether, when a communication establishment request 120 is received, the (certain) first identifier included in the communication establishment request 120 is currently stored in the first memory 110 or not. In addition, the response information 126 includes the information which (certain) first identifier was included in a communication establishment request 120 received by the front end unit 102.

Further, each time when the front end unit 102 receives a communication establishment request 120, the generated response information 126 is transmitted to the processing unit 104 using connection 130.

If the certain first identifier included in a received communication establishment request 120 is not included in the first memory 110 (in other words no set of parameters is stored in the first memory which includes a requested first parameter), then, as mentioned, this is indicated by the response information 126. In this case, the respective response information 126 is interpreted as a request by the processing unit 104 to transfer a set of parameters including the certain first identifier which was included in the communication establishment request 120 to the front end unit 102. For example, let's assume that a communication establishment request 120 includes a first identifier C1 which is, in the example of FIG. 1, not stored in the first memory 110 but only in the second memory 112 (cf. FIG. 2). In this case, the front end unit 102 would send respective response information 126 which indicates this to the processing unit 104 so that the processing unit 104 retrieves a set of parameters including the first identifier C1, i.e. the set of parameters 118-3 (see FIG. 2) from the second memory 112 and transfers the retrieved set of parameters to the front end unit 102. Of course, in an alternative embodiment, only a respective second identifier may also be transferred. In this embodiment, the front end unit 102 could store the information which first identifier was included in response information 126 which was sent to the processing unit 104.

Once the set of parameters 118-3 is stored in the first memory 110 and a further communication establishment request 120 including the first identifier C1 is received, the front end unit 102 is able to send a response to the reader/writer device 114, the response including the second identifier C2 included in the set of parameters 118-3. Since the sending of the response information 126 and transferring the set of parameters 118-3 from the processing unit 104 to the front end unit 102 takes some time, the front end unit 102 is not able to "immediately", i.e. in the next time frame, send a response 122 including the second identifier C2. Connection establishment in this case is therefore slower than in the case described above where the set of parameters including a certain first identifier which was included in the communication establishment request 120 was stored in the first memory 110. In the following this case may also be described by "the communication establishment request could not be handled immediately".

The communication establishment request 120 may also be referred to as "anti-collision request" and the response 122 may also be referred to as "anti-collision response". Further, it should be noted that the communication establishment request 120 may be the first request from a reader/writer device for establishing a communication, i.e. when a communication is established no other requests or messages have been exchanged between the reader/writer device 114 and the near field communication device 100. The anti-collision request may be sent at any time and may be used for restarting a connection.

As the examples described above illustrate, in order to establish a communication between the reader/writer device 114 and the near field communication device 100 quickly, i.e. "immediately", it is desirable that in the first memory a large number of sets of parameters is stored. However, as mentioned, due to the fact that memory is expensive in the front end unit 102, it is not possible to store all sets of parameters of all possible applications stored in the second memory 112. Therefore, a solution has to be found regarding how to decide which sets of parameters are to be stored in the first memory 110 and which ones not.

For providing such a solution, according to the embodiment shown in FIG. 1, the response information 126 is transmitted from the front end unit 102 to the processing unit 104. As mentioned, the response information 126 is transmitted from the front end unit 102 to the processing unit 104 every time, i.e. whenever, the front end unit 102 receives a communication establishment request 120.

As mentioned, the response information 126 is transmitted from the front end unit 102 to the processing unit 104 each time when a communication establishment request 120 is received.

In other words, in any case, i.e. independently of whether a first identifier included in a communication establishment request 120 is presently (i.e. when the request is received) stored in the first memory 110 or not, the front end unit 102 generates response information 126 and transmits it to the processing unit 104.

The processing unit 104 evaluates the received response information 126 and controls which sets of parameters are to be transferred, stored or deleted in the first memory 110. In other words, the processing unit 104 based on the communication protocol controls the contents of the first memory 110, the control being dependent on the response information 126. The control may be performed based on a predefined algorithm. In one example, the algorithm may take into account the number of times a certain first identifier has been used for a communication between the front end unit 102 and the external reader/writer device 114. In other words, in this embodiment the algorithm takes into account the number of times a certain first identifier is included in a communication establishment request 120 (as mentioned above, the response information 126 includes the information which set of parameters, i.e. which set of parameter including a first identifier of a communication establishment request, was used for immediately handling a communication establishment request 120). Other possible algorithms could be based on deleting the oldest set of parameters from the first memory 110. Other algorithms known from cache update algorithms could be used such as e.g. ring list.

The above described procedure has the following advantages: The first memory 110 may have a very small size and, hence, manufacturing costs are low. However, despite the small sized first memory 110, a connection can in most cases be set up immediately since the processing unit 104 controls, based on a sophisticated algorithm dependent on the response information 126, which sets of parameters are to be stored in the first memory 110. Therefore, chances are higher that a communication establishment request can be handled immediately, i.e. without delay than if no smart updated algorithm was used which is based on the response information 126. As mentioned above, in case a certain first identifier is stored in the first memory 110, the request may be handled immediately. On the other hand, if a certain first identifier is not stored in the first memory 110, then the request cannot be handled immediately. In this case, the anti-collision data may be updated, i.e. loaded into the first memory 110, so that the request can be handled later, e.g. in the next cycle.

The near field communication device 100 may provide a large number of applications. In an embodiment, the first and second identifiers may be application identifiers. In other words, the first and second identifiers may be used for identifying an application. This, however, is not mandatory. The first and second identifiers could identify other entities.

Examples of applications are: payment, public transport ticketing, events tickets, loyalty programs, coupons, data exchange, e.g. business cards, web addresses, network configuration data (e.g. for Wi-Fi networks), images and the like.

In a further embodiment the near field communication device may be a near field communication device enabling FeliCa™ services, i.e. the near field communication device would emulate a FeliCa card. In this case the first identifier may also be referred to as system code and the second identifier may be referred to as a card number (IDm). The system code identifies the authority that is responsible for managing the memory on the card. An example for an authority is e.g. "SuiCa" ™, Transport ticket by East Japan Railways, [JR East]. In other words, there is an embodiment where the first identifier identifies the authority that is responsible for managing the data structures within the second memory. The authority may also own the encryption keys of the respective memory areas.

The file system of the cards which corresponds to the file system in the second memory 110 may be very simple and may not necessarily have symbolic names. Directories and files (named "areas" and "services" in FeliCa) may be identified by numbers.

In this context it should also be noted that in some embodiments, e.g. in the case of FeliCa™, in the first memory only the anti-collision data consisting of SystemCode and IDm is stored that are needed to access the file system later.

Therefore, in the case of FeliCa™, some management should be in place that two applications residing on the same card do not use the same memory addresses. The system code adds another hierarchy layer to the memory addressing (two applications can use the same areas/services when they belong to different system codes) and usually also denotes the authority that manages the memory. Each authority can in addition use different security keys to control the access to its managed memory. For example Japan Railways has been assigned a system code and is responsible to make sure that applications don't use the same memory on cards with their system code.

It should also be noted, that type B specified by ISO/IEC14443 includes a concept that is another embodiment for a first identifier. Type B has the notion of an "application family identifier" (AFI). There are values specified for different application families (e.g. for payment of public transport). The reader/writer can "search" for a specific AFI and the cards tell their AFI to the reader/writer during anti-collision.

In a further embodiment, the second identifier may be a card number of a card the near field communication device 100 emulates. The card number may be unique for at least one communication session. Alternatively, it is also possible that the card number is unique for the lifetime of the card. This number is the "address" of the card. The address would, thus, be included in the response 122 to the communication establishment request 120 and be used in the first communication by the reader/writer device 114 to address a card in the field (each following commands would typically include such an address as one of the first parameters). Otherwise the reader/writer device 114 could not send a command to a specific card (near field communication device 100 emulating the card) but all cards (e.g. other near field communication devices) in the field would answer to a command. Therefore, this number (second identifier) is not associated with an application but with a generic means used in the reader/writer card communication (similar to an IP address of a computer having multiple IP-based applications).

If the card number is unique for at least one communication session this allows to uniquely address the card and/or application during communication and avoids that other cards in the range of the NFC field be addressed.

Figure 3:
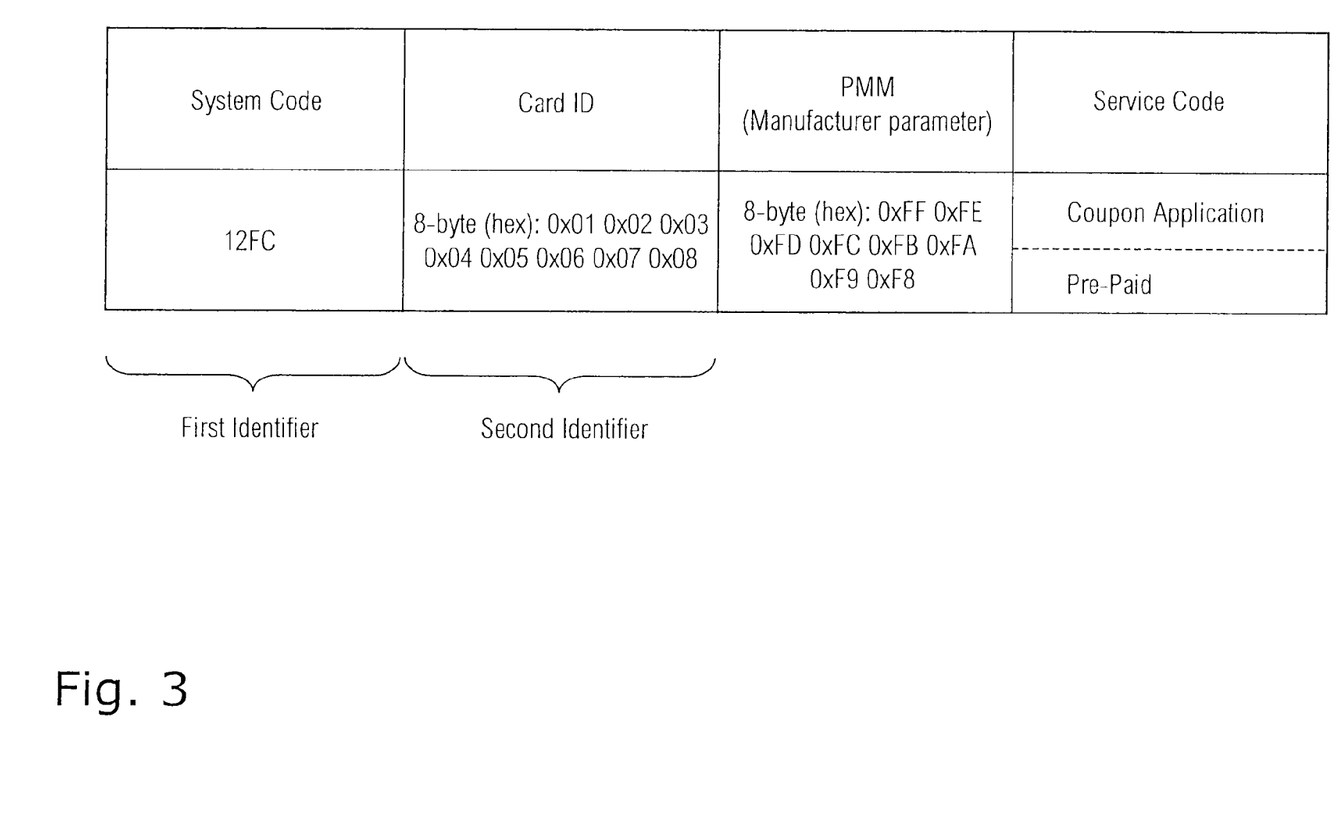
FIG. 3 shows an example for the format of the data stored in the processing unit and a front end unit of near field communication device.

FIG. 3 shows an embodiment of a data structure for the data stored in the first memory 110 and second memory 112. This data structure is in accordance with the FeliCa™ specification and includes a system code, a card ID (also referred to as Manufacture ID, IDm, in FeliCa), a PMm (Manufacture Parameters, e.g. providing information on the card version and command processing time), and a service code. In this example, the system code may be seen as the first identifiers and the card ID as the second identifiers shown in FIGS. 1 and 2.

Figure 4:
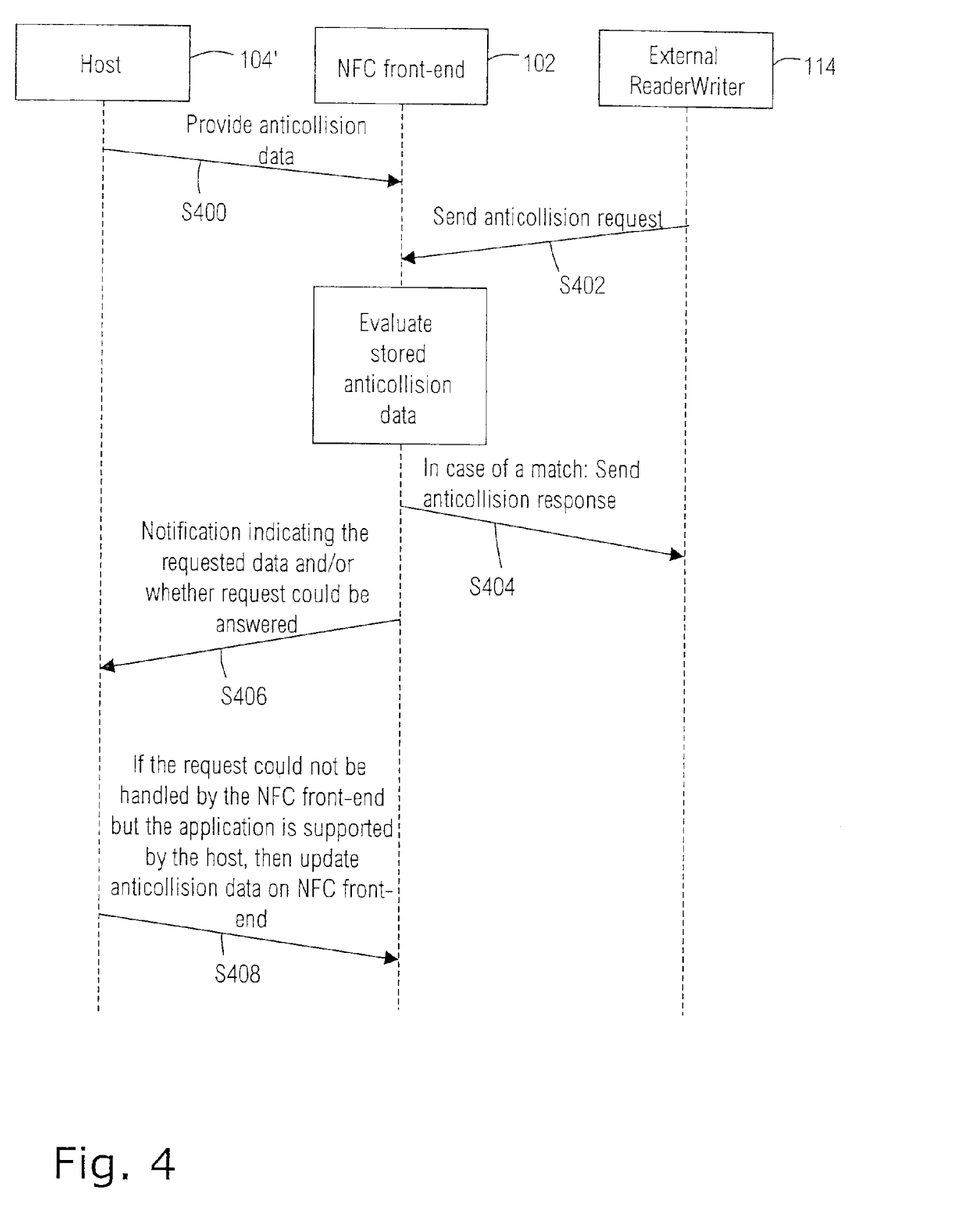
FIG. 4 shows a flow chart for illustrating the communication between a host, the front end unit and an external reader/writer device.

FIG. 4 shows a diagram illustrating the communication between a host 104', a front end unit 102 and an external reader/writer device 114. The host 104' is an example for the processing unit 104 shown in FIG. 1.

As seen, at S400, the host 104' provides anti-collision data to the front end unit 102. "Anti-collision data" could for example include the sets of parameters 118-1, . . . , 118-4 shown in FIGS. 1 and 2.

At S402, the external reader/writer device 114 sends an anti-collision request to the front end unit 102. The anti-collision request corresponds to the communication establishment request 120 shown in FIG. 1.

Upon receipt of the anti-collision request, the front end unit 102 evaluates the anti-collision data stored in the first memory 110. In other words, it is evaluated whether a respective first identifier included in the anti-collision request sent at S402 is stored in the first memory 110 or not. In case the respective first identifier is stored in the first memory 110, at S404 an anti-collision response is sent to the external reader/writer 114 immediately, e.g. within the next time frame. This anti-collision response corresponds to the response 122 shown in FIG. 1.

Then, at S406 the front end unit 102 sends a notification to the host 104'. The notification indicates the requested data (e.g. second identifier included in the set of parameters in which the first identifier of the anti-collision request is included) and whether the anti-collision request could be handled immediately or not.

In case there was a match (S404 was sent immediately) the front end unit 102 does not need to request transfer of data from the host 104' to the front end unit 102. In other words, since the set of parameters that includes the first identifier which was included in the anti-collision request was already stored in the first memory 110, it is not necessary that the host 104' transfers any set of parameters. In any case, i.e. whether there was a match or not, the information whether there was a match or not is transferred from front end unit 102 to host 104'. This information is referred to response information above.

At S408, if the anti-collision request could not be handled immediately by the NFC front end 102 (because the respective first identifier that was included in the anti-collision request is not stored in the first memory 110) but the application is supported by the host (i.e. the respective first identifier which was included in the anti-collision request at S402 is stored in the second memory 112), then the data is transferred from the host 104' to front end unit 102. In this case, the parameters required for the correct anticollision response are ready to be used in the next polling cycle.

Figure 5:
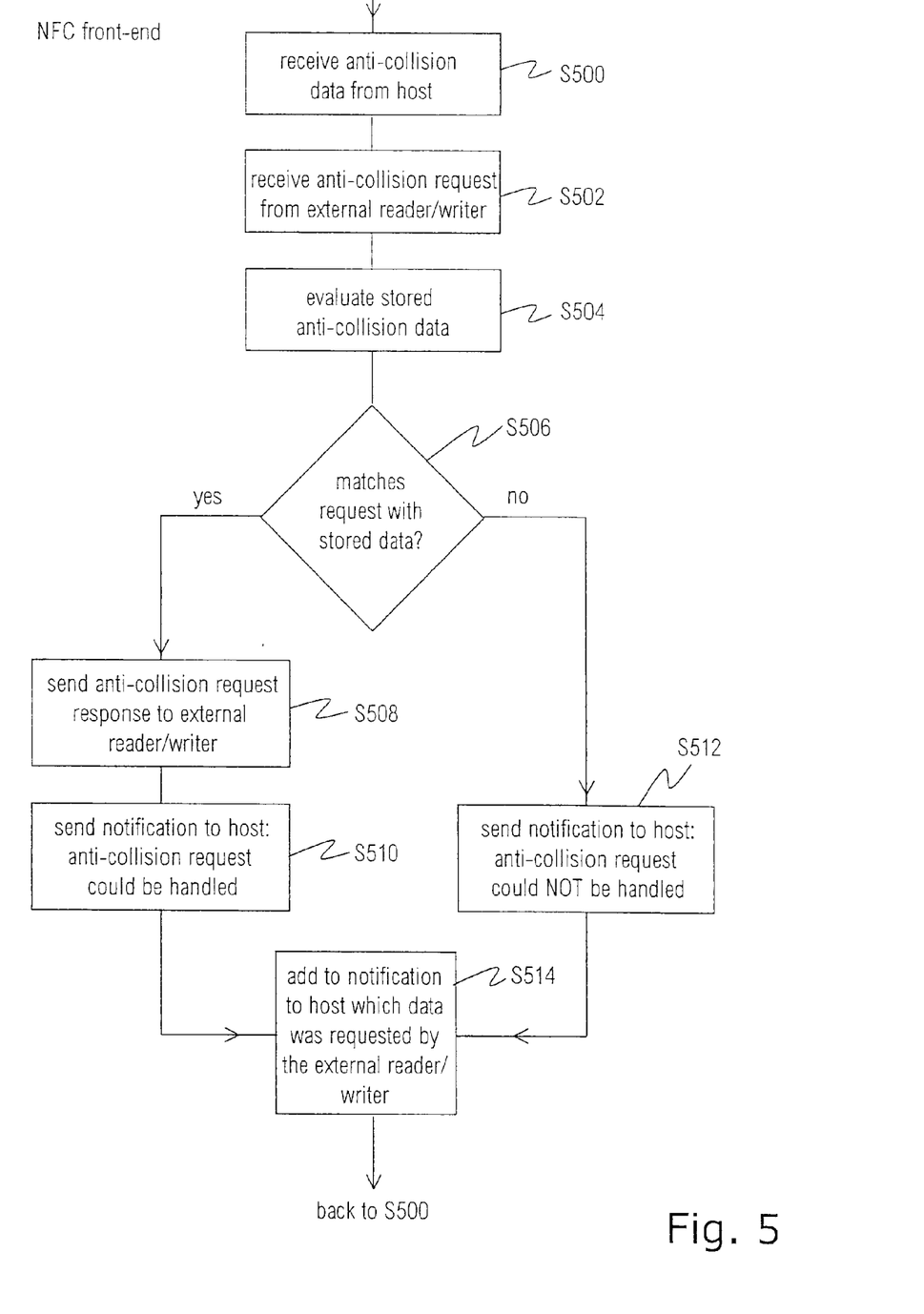
FIG. 5 shows a flowchart of a process running on a front end unit.

FIG. 5 shows a flowchart showing what operations are performed in the front end unit 102.

At S500 anti-collision data is received from the host (cf. S400 in FIG. 4).

At S502 an anti-collision request is received from the external reader/writer device 114.

At S504, the received anti-collision request is evaluated and compared to the anti-collision data (also referred to as sets of parameters above) stored in the front end unit.

In case there was a match (i.e. the first identifier included in the anti-collision request as S502 is stored in the first memory 110) at S506 processing continues at S508.

At S508 an anti-collision request response (response 122 in FIG. 1) is immediately sent to the external reader/writer device 114.

Then, at S510 a notification is sent to the host. The notification, also referred to as "response information" above, in this case includes the information that the anti-collision request could be handled.

In case there was no match found, i.e. at S506 it was determined that the first identifier included in the anti-collision request at S502 is not stored in the first memory 110, at S512 a notification is sent to the host (as an example for a processing unit 104 in FIG. 1). In this case, the notification (response information) includes the information that the anti-collision request could not be handled immediately.

At S514 information about the requested data which is contained in the anti-collision request is appended to the notification to the host which is then used in the algorithm to control which sets of parameters are stored in the first memory 110. In other words, the contents of the first memory is controlled based on the notification (response information).

Figure 6:
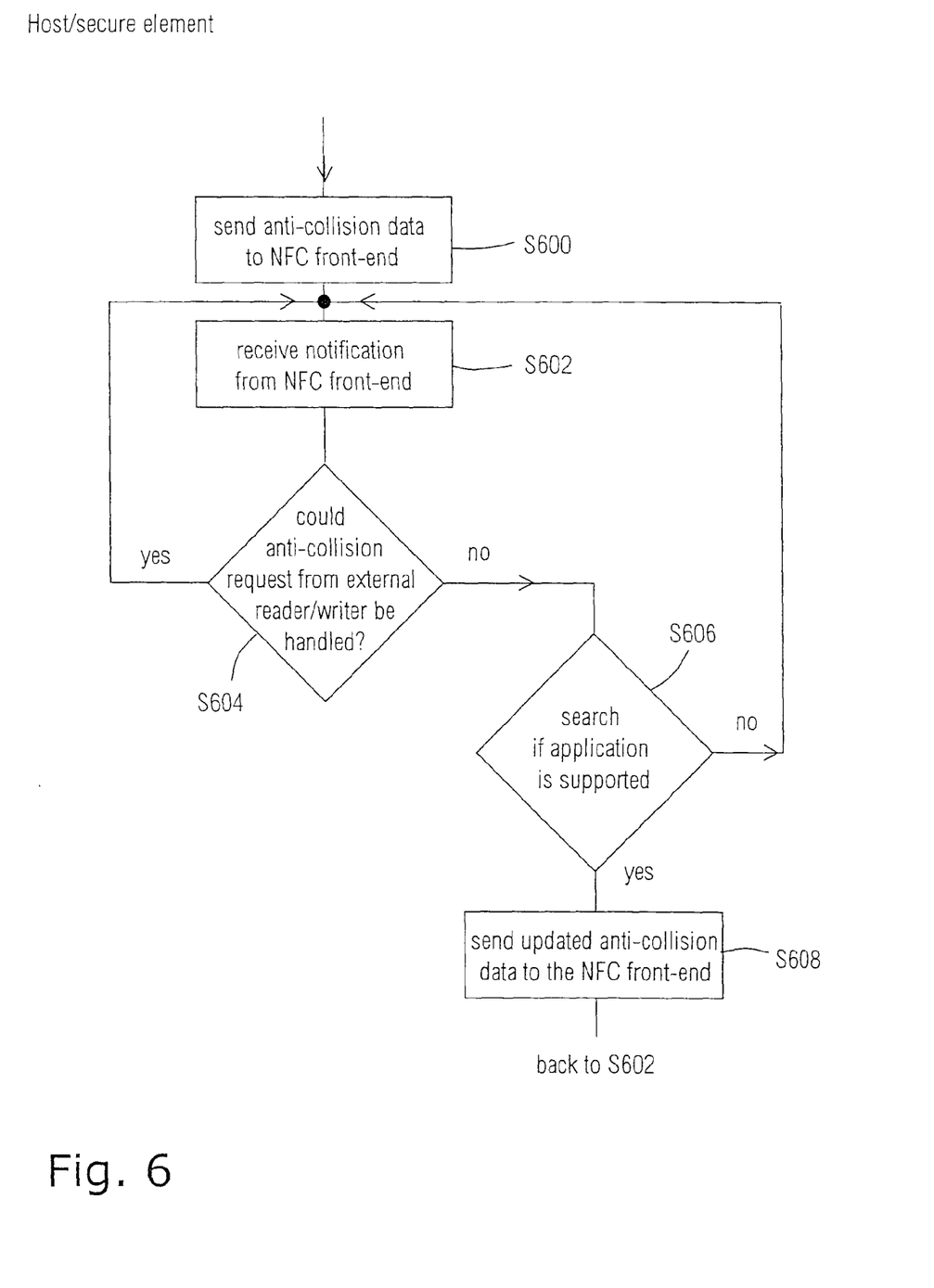
FIG. 6 shows a flowchart of a process running on a host.

FIG. 6 shows a further flowchart illustrating the processing in the processing unit 104. As mentioned above, an example for a processing unit 104 is a host or secure element.

At S600 anti-collision data is sent to the NFC front end unit 102. This may be seen as an "initialization" of the front end unit 102 where the processing unit 104 transfers initial sets of parameters from the second memory 112 to the first memory 110.

At S602 a notification is received from the front end unit 102.

At S604, it is evaluated whether the anti-collision request from the external reader/writer device 114 could be handled immediately. If this was the case, processing continues at S602.

However, if this was not the case, then processing continues at S606. In this case the processing unit 104 checks whether the requested application, i.e. the application identified with the first identifier is supported by the processing unit 104 or not. If it is supported, updated anti-collision data is sent to the front end unit 102 at S608. Then processing continues at S602.

However, if at S606 it was determined that the application is not supported then processing directly continues at S602.

Figure 7:
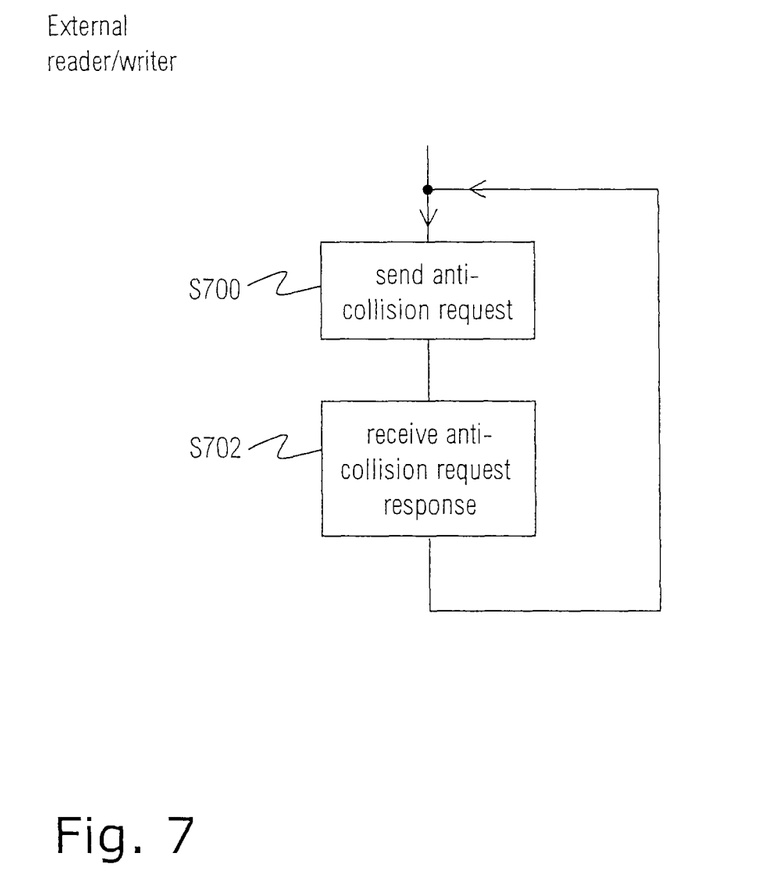
FIG. 7 shows a flowchart of a process running on an external reader/writer device.

FIG. 7 shows a further flowchart illustrating the processing in the external reader/writer device 114.

At S700 an anti-collision request is sent. As already mentioned in connection with FIG. 1, the anti-collision request (communication establishment request 120) includes a first identifier of a certain application.

At S702 an anti-collision request response is received.

As mentioned above, in case the first identifier included in the anti-collision request at S700 is stored in the first memory 110, then the communication between the near field communication device 100 and the reader/writer device 114 may be established "immediately". The reason is that the front end unit 102 does not need to request any set of parameters from the processing unit 104. The front end unit 102 is able to directly respond to the anti-collision request since it stores a respective set of parameters in the first memory 110.

Although specific embodiments have been illustrated and described herein, it will be appreciated by those of ordinary skill in the art that a variety of alternate and/or equivalent implementations may be substituted for the specific embodiments shown and described without departing from the scope of the described embodiments. This application is intended to cover any adaptations or variations of the specific embodiments discussed herein. Therefore, it is intended that this invention be limited only by the claims and the equivalents thereof.

The invention claimed is:

1. A near field communication (NFC) device comprising:
a front end unit adapted to communicate with an external reader/writer device, the front end unit including a first memory having a first size, the first memory being adapted to store a first number of sets of parameters of an application, wherein each set of parameters includes a first identifier and a second identifier;
a processing unit including a second memory having a second size which is larger than the first size, the second memory being adapted to store the application and a second number of said sets of parameters of the application, the second number being larger than the first number;
wherein the front end unit is further adapted to receive a communication establishment request from the external reader/writer device, the communication establishment request including a certain first identifier;
wherein the front end unit is further adapted to check, when a communication establishment request is received, whether the certain first identifier is stored in the first memory, and if yes to send a response to the reader/writer device, the response including a respective second identifier, the respective second identifier being part of the same set of parameters as the certain first identifier, wherein the front end unit is further adapted to generate response information,
wherein the response information indicates whether when a communication establishment request is received the certain first identifier is stored in the first memory or not;
wherein the front end unit is further adapted to send, each time when a communication establishment request is received, the response information to said processing unit;
wherein the processing unit is further adapted to evaluate the response information and to control which sets of parameters are to be stored in the first memory, the control being dependent on the response information.

2. The near field communication (NFC) device of claim 1, wherein, the processing unit is adapted to evaluate the response information and, in case the response information indicates that the certain first identifier is not stored in the first memory, to retrieve a certain set of parameters including the certain first identifier from the second memory and to transmit the certain set of parameters to the front end unit.

3. The near field communication (NFC) device of claim 1, wherein the first and second identifiers are application identifiers for identifying an application of the near field communication (NFC) device.

4. The near field communication (NFC) device of claim 1, wherein the second memory is included in a secure element, and the second memory stores a set of parameters of at least one application.

5. The near field communication (NFC) device of claim 1, wherein the first identifier identifies the authority that is responsible for managing the data structures within the second memory.

6. The near field communication (NFC) device of claim 1, wherein the first identifier is an application family identifier in accordance with the ISO/IEC 14443 standard.

7. The near field communication (NFC) device of claim 1, wherein the second identifier includes a card number which is unique for at least one communication session.

8. The near field communication (NFC) device of claim 1, wherein the first memory has a size of 50-100 kilo bytes.

9. The near field communication (NFC) device of claim 1, wherein the processing unit controls which sets of parameters are to be stored in the first memory depending on an update algorithm.

10. The near field communication (NFC) device of claim 1, wherein the first memory does not store first identifiers of all near field communication applications.

11. A method for near field communication, comprising:
storing, in a first memory of a front end unit, the first memory having a first size, a first number of sets of parameters of an application, wherein each set of parameters includes a first identifier and a second identifier;
storing, in a second memory of a processing unit, the second memory having second size which is larger than the first size, the application and a second number of said sets of parameters of the application, the second number being larger than the first number;
receiving, at the front end unit, a communication establishment request from an external reader/writer device, the communication establishment request including a certain first identifier;
checking, each time when a communication establishment request is received, whether the certain first identifier is stored in the first memory, and if yes sending a response to the reader/writer device, the response including a respective second identifier, the respective second identifier being part of the same set of parameters as the certain first identifier, generating, at the front end unit, response information, wherein the response information indicates whether when a communication establishment request is received the certain first identifier is stored in the first memory or not;

sending, each time when a communication establishment request is received, the response information to said processing unit;

evaluating, at the processing unit, the response information and controlling which sets of parameters are to be stored in the first memory, the control being dependent on the response information.

12. The method of claim 11, wherein, the processing unit evaluates the response information and, in case the response information indicates that the certain first identifier is not stored in the first memory, the processing unit retrieves a certain set of parameters including the certain first identifier from the second memory and transmits the certain set of parameters to the front end unit.

13. The method of claim 11, wherein the first and second identifiers are application identifiers for identifying an application of the near field communication (NFC) device.

14. The method of claim 11, wherein the second memory is included in a secure element and the second memory stores a set of parameters of at least one application.

15. The method of claim 11, wherein the processing unit controls which sets of parameters are to be stored in the first memory depending on an update algorithm.

16. A non-transitory computer-readable storage medium storing computer-readable instructions that, when executed by a computer, cause the computer to perform a method comprising:

storing, in a first memory of a front end unit, the first memory having a first size, a first number of sets of parameters of an application, wherein each set of parameters includes a first identifier and a second identifier;

storing, in a second memory of a processing unit, the second memory having second size which is larger than the first size, the application and a second number of said sets of parameters of the application, the second number being larger than the first number;

receiving, at the front end unit, a communication establishment request from an external reader/writer device, the communication establishment request including a certain first identifier;

checking, each time when a communication establishment request is received, whether the certain first identifier is stored in the first memory, and if yes sending a response to the reader/writer device, the response including a respective second identifier, the respective second identifier being part of the same set of parameters as the certain first identifier, generating, at the front end unit, response information, wherein the response information indicates whether when a communication establishment request is received the certain first identifier is stored in the first memory or not;

sending, each time when a communication establishment request is received, the response information to said processing unit;

evaluating, at the processing unit, the response information and controlling which sets of parameters are to be stored in the first memory, the control being dependent on the response information.

17. A near field communication system comprising:

an external reader/writer device;

a near field communication device including a front end unit adapted to communicate with an external reader/writer device, the front end unit including a first memory having a first size, the first memory being adapted to store a first number of sets of parameters of an application, wherein each set of parameters includes a first identifier and a second identifier;

a processing unit including a second memory having a second size which is larger than the first size, the second memory being adapted to store the application and a second number of said sets of parameters of the application, the second number being larger than the first number;

wherein the front end unit is further adapted to receive a communication establishment request from the external reader/writer device, the communication establishment request including a certain first identifier;

wherein the front end unit is further adapted to check, when a communication establishment request is received, whether the certain first identifier is stored in the first memory, and if yes to send a response to the reader/writer device, the response including a respective second identifier, the respective second identifier being part of the same set of parameters as the certain first identifier, wherein the front end unit is further adapted to generate response information, wherein the response information indicates whether when a communication establishment request is received the certain first identifier is stored in the first memory or not;

wherein the front end unit is further adapted to send, each time when a communication establishment request is received, the response information to said processing unit;

wherein the processing unit is further adapted to evaluate the response information and to control which sets of parameters are to be stored in the first memory, the control being dependent on the response information.

* * * * *